United States Patent
Takagi

(10) Patent No.: US 7,386,330 B2
(45) Date of Patent: Jun. 10, 2008

(54) BI-AXIAL SWIVEL MECHANISM IN ELECTRONIC APPARATUS

(75) Inventor: Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 714 days.

(21) Appl. No.: 11/044,084

(22) Filed: Jan. 28, 2005

(65) Prior Publication Data

US 2006/0094482 A1    May 4, 2006

(30) Foreign Application Priority Data

Oct. 29, 2004    (JP)    ............... 2004-316297

(51) Int. Cl.
*H04Q 7/32* (2006.01)

(52) U.S. Cl. ............... 455/575.3; 455/575.1; 455/550.1; 455/90.3; 379/433.01; 379/433.11; 379/433.13; 16/221; 16/223; 16/235

(58) Field of Classification Search ............ 455/575.3, 455/575, 1, 550.1, 90.1, 90.2, 90.3, 556.1, 455/556.2, 557, 500, 517; 379/433.01, 433.11, 379/433.13; 16/221, 223, 235, 239
See application file for complete search history.

(56) References Cited

FOREIGN PATENT DOCUMENTS

| JP | 2000-004084 | 1/2000 |
|---|---|---|
| JP | 2001-345902 | 12/2001 |
| JP | 2002-171189 | 6/2002 |
| JP | 2002-209000 | 7/2002 |

*Primary Examiner*—Keith T Ferguson
(74) *Attorney, Agent, or Firm*—Arent Fox LLP

(57) ABSTRACT

A support shaft is received in a socket for relative rotation. A first hollow space penetrates through the support shaft. A first hollow member extends in a first direction from the tip end of the support shaft. The first hollow member defines a second hollow space extending in the first direction. The second hollow space receives a rotation shaft. A second hollow member extends in a second direction opposite to the first direction from the tip end of the support shaft. The second hollow member defines a third hollow space extending in the second direction from the tip end of the first hollow space. The electronic apparatus allows penetration of the wire through the first and third hollow spaces. No additional space is required around the second hollow member for locating the wire. The electronic apparatus is thus allowed to enjoy a reduced size or volume.

12 Claims, 12 Drawing Sheets

BI-AXIAL SWIVEL MECHANISM IN ELECTRONIC APPARATUS

BACKGROUND OF THE INVENTION

1. Field of the Invention

The present invention relates to an electronic apparatus such as a cellular or mobile phone terminal. In particular, the invention relates to a cellular phone terminal of a so-called flip or clamshell type.

2. Description of the Prior Art

A cellular or mobile phone terminal of a so-called clamshell type is well known. The cellular phone terminal of the type includes a main enclosure exposing ten keys at the front surface. A display enclosure is coupled to the main enclosure for rotation around a rotation shaft parallel to the front surface of the main enclosure. The display enclosure is superposed on the front surface of the main enclosure through the rotation around the rotation shaft.

A support shaft is fixed to the main enclosure. The support shaft stands upright from the front surface of the main enclosure. An annular member is coupled to the support shaft for relative rotation. The annular member is designed to receive the aforementioned rotation shaft. The rotation shaft is thus allowed to rotate around the support shaft. The display enclosure may oppose the screen of the display panel to the front surface of the main enclosure, or may alternatively expose the screen of the display panel outside, when the display enclosure is superposed on the front surface of the main enclosure.

For example, the display panel within the display enclosure should be connected to a printed circuit board within the main enclosure through wiring. A hollow space is defined within the support shaft so as to penetrate through the support shaft along the longitudinal axis. Likewise, a hollow space is defined within the rotation shaft so as to penetrate through the rotation shaft along the longitudinal axis. Wires run through the hollow spaces one after another. Accordingly, an additional space must be kept around the rotation shaft for accommodating the wires.

SUMMARY OF THE INVENTION

It is accordingly an object of the present invention to provide a bi-axial swivel mechanism greatly contributing to a reduced volume of an electronic apparatus such as a cellular or mobile phone terminal.

According to a first aspect of the present invention, there is provided an electronic apparatus comprising: first and second enclosures; a socket fixed to the first enclosure; a support shaft received in the socket for relative rotation; a first hollow space penetrating through the support shaft along the longitudinal axis of the support shaft; a first hollow member extending in a first direction from the tip end of the support shaft along an imaginary plane intersecting with the longitudinal axis of the support shaft, said first hollow member defining a second hollow space extending in the first direction; a rotation shaft received in the second hollow space so as to couple the second enclosure to the first enclosure for relative rotation; a second hollow member extending in a second direction opposite to the first direction from the tip end of the support shaft along the imaginary plane, said second hollow member defining a third hollow space extending in the second direction from the tip end of the first hollow space; and a wire penetrating through the first and third hollow spaces.

The electronic apparatus of the type allows penetration of the wire through the first and third hollow spaces. The wire is thus extending from the first enclosure to the second enclosure. The third hollow space extends in the second direction from the tip end of the first hollow space, so that the third hollow space is continuous with the first hollow space. No additional space is required around the second hollow member for locating the wire. The electronic apparatus is thus allowed to enjoy a reduced size or volume.

The electronic apparatus may further include: a first elongated depression formed on the outer periphery of the support shaft all over the entire length of the first hollow space; a first insert member received in the first elongated depression at the outer periphery of the support shaft, said first insert member defining the first hollow space in the first elongated depression; a second elongated depression formed on the outer periphery of the second hollow member all over the entire length of the third hollow space; and a second insert member received in the second elongated depression at the outer periphery of the second hollow member, said second insert member defining the third hollow space in the second elongated depression.

The electronic apparatus of the type allows an easy arrangement of the wire within the first and second elongated depressions. After the first and second insert members have been received in the first and second depressions, the first and second elongated depressions are closed to define the first and third hollow spaces containing the wire. The electronic apparatus can be assembled in this manner in a facilitated manner. Moreover, the first and second insert members serve to reinforce the strength of the support shaft and the second hollow member.

A predetermined bi-axial swivel mechanism may be provided to realize the aforementioned electronic apparatus. The swivel mechanism may comprise: a socket fixed to an enclosure; a support shaft received in the socket for relative rotation; a first hollow space penetrating through the support shaft along THE longitudinal axis of the support shaft; a first hollow member extending in a first direction from THE tip end of the support shaft along an imaginary plane intersecting with the longitudinal axis of the support shaft, said first hollow member defining a second hollow space extending in the first direction; and a second hollow member extending in a second direction opposite to the first direction from the tip end of the support shaft along the imaginary plane, said second hollow member defining a third hollow space extending in the second direction from the tip end of the first hollow space. In this case, the first and third hollow spaces are designed to receive the insertion of a wire. No additional space is required around the second hollow member for locating the wire as described above. The swivel mechanism of the type surely contributes to a reduction in the size or volume of an electronic apparatus in the aforementioned manner.

The bi-axial swivel mechanism may further comprise: a first elongated depression formed on the outer periphery of the support shaft all over the entire length of the first hollow space; a first insert member received in the first elongated depression at the outer periphery of the support shaft, said first insert member defining the first hollow space in the first elongated depression; a second elongated depression formed on the outer periphery of the second hollow member all over the entire length of the third hollow space; and a second insert member received in the second elongated depression at the outer periphery of the second hollow member, said second insert member defining the third hollow space in the second elongated depression.

According to a second aspect of the present invention, there is provided an electronic apparatus comprising: a first enclosure; a support shaft supported on the first enclosure for rotation around a vertical axis; a second enclosure designed to rotate relative to the support shaft around a horizontal axis defined within a plane set perpendicular to the vertical axis; and a restriction member supported on the support shaft for movement between first and second positions, said restriction member at the first position designed to restrict a relative rotation around the horizontal axis between the first enclosure and the second enclosure over a range smaller than 180 degrees, said restriction member at the second position designed to allow the relative rotation around the horizontal axis between the first enclosure and the second enclosure over a range equal to or larger than 180 degrees.

The electronic apparatus enables the relative rotation set over a range smaller than 180 degrees when the restriction member is positioned at the first position. The electronic apparatus enables the relative rotation set over a range equal to or larger than 180 degrees when the restriction member is positioned at the second position. The movement of the restriction member in this manner realizes the different ranges of the relative rotation. An appropriate range can be selected for the relative rotation in the electronic apparatus in view of requirements.

If the relative rotation is restricted to a range of 160 degrees, for example, with the restriction member at the first position in the electronic apparatus such as a cellular phone terminal, the relative rotation can be set at the maximum 160 degrees between the first and second enclosures. A relative rotation of 160 degrees serves to establish a superior positional relationship between the transmitter and the receiver in the cellular phone terminal in conformity with the positional relationship between the mouth and ear of the user. The user is allowed to enjoy a superior acoustic performance of the cellular phone terminal.

The restriction member may be forced to move to the second position from the first position in response to the rotation of the horizontal axis around the vertical axis by 180 degrees. This enables an automatic selection of the range in response to the rotation of the horizontal axis.

A predetermined bi-axial swivel mechanism may be provided to realize the aforementioned electronic apparatus. The swivel mechanism may comprise: a socket; a support shaft received in the socket for rotation around a vertical axis; a rotation shaft having the longitudinal axis on a horizontal axis defined within a plane perpendicular to the vertical axis; and a restriction member supported on the support shaft for movement between first and second positions, said restriction member at the first position designed to restrict a relative rotation around the horizontal axis between the support shaft and the rotation shaft over a range smaller than 180 degrees, said restriction member at the second position designed to allow the relative rotation around the horizontal axis between the support shaft and the rotation shaft over a range equal to or larger than 180 degrees. The bi-axial swivel mechanism of the type may allow the movement of the restriction member from the first position to the second position in response to the rotation of the horizontal axis around the vertical axis by 180 degrees in the aforementioned manner.

According to a third aspect of the present invention, there is provided an electronic apparatus comprising: a first enclosure; a support shaft supported on the first enclosure for rotation around a vertical axis; a second enclosure designed to rotate relative to the support shaft around a horizontal axis defined within a plane set perpendicular to the vertical axis; and a restriction member supported on the support shaft for movement between first and second positions, said restriction member at the first position designed to restrict a relative rotation around the horizontal axis of a first attitude between the first enclosure and the second enclosure over a range smaller than 180 degrees, said restriction member at the second position designed to allow the relative rotation around the horizontal axis of a second attitude between the first enclosure and the second enclosure over a range equal to or larger than 180 degrees, said second attitude being set at a 180 degrees turn from the first attitude around the vertical axis.

The electronic apparatus enables the relative rotation set over a range smaller than 180 degrees when the restriction member is positioned at the first position. The electronic apparatus enables the relative rotation set over a range equal to or larger than 180 degrees when the restriction member is positioned at the second position. The movement of the restriction member in this manner realizes the different ranges of the relative rotation. An appropriate range can be selected for the relative rotation in the electronic apparatus in view of requirements.

Moreover, the restriction member is positioned at the first position when the horizontal axis takes the first attitude. The restriction member is also positioned at the second position when the horizontal axis takes the second attitude. The attitude of the horizontal axis is related to the attitude or direction of the second enclosure relative to the first enclosure. The range of the relative rotation can be selected depending upon the attitude or direction of the second enclosure.

In addition, if the relative rotation is restricted to a range of 160 degrees, for example, with the restriction member at the first position in the electronic apparatus such as a cellular phone terminal, the relative rotation can be set at the maximum 160 degrees between the first and second enclosures. A relative rotation of 160 degrees serves to establish a superior positional relationship between the transmitter and the receiver in the cellular phone terminal in conformity with the positional relationship between the mouth and ear of the user. The user is allowed to enjoy a superior acoustic performance of the cellular phone terminal.

The electronic apparatus may further comprise a cam mechanism located on the first enclosure, said cam mechanism causing the movement of the restriction member in response to the rotation of the support shaft. The cam mechanism serves to forcedly move the restriction member from the first position to the second position. The cam mechanism thus enables an automatic selection of the range in response to the rotation of the horizontal axis.

A predetermined bi-axial swivel mechanism may be provided to realize the aforementioned electronic apparatus. The bi-axial swivel mechanism may comprise: a socket; a support shaft received in the socket for relative rotation around a vertical axis; a rotation shaft having the longitudinal axis on a horizontal axis defined within a plane perpendicular to the vertical axis; and a restriction member supported on the support shaft for movement between first and second positions, said restriction member at the first position designed to restrict a relative rotation around the horizontal axis of a first attitude between the support shaft and the rotation shaft over a range smaller than 180 degrees, said restriction member at the second position designed to allow the relative rotation around the horizontal axis of a second attitude between the support shaft and the rotation shaft over a range equal to or larger than 180 degrees, said second attitude being set at a 180 degrees turn from the first attitude around the vertical axis. The bi-axial swivel mechanism may further comprise a cam mechanism located on the socket, said cam mechanism causing the movement of the restriction member in response to the rotation of the support shaft, in the aforementioned manner.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
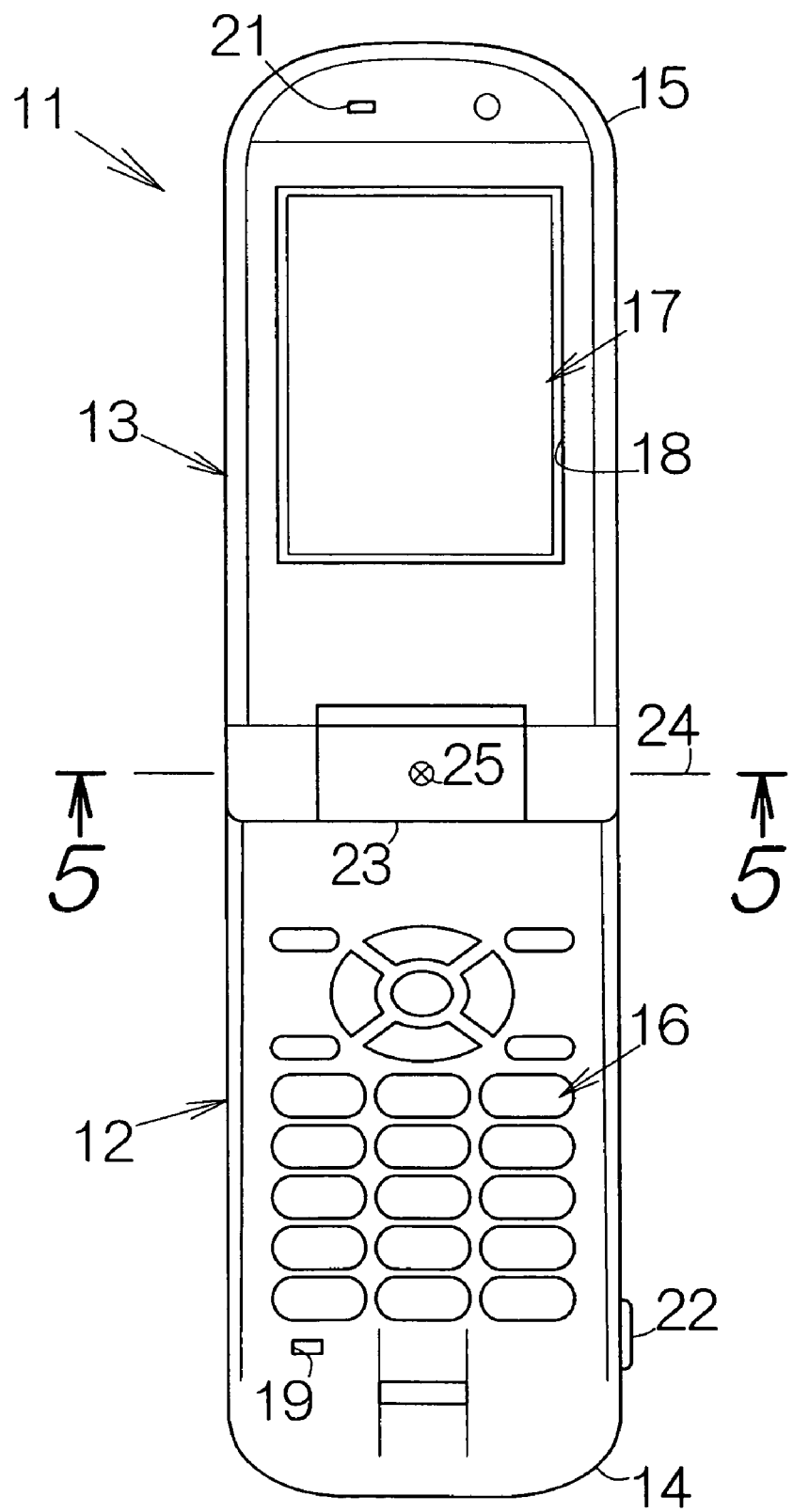
FIG. 1 is a front view schematically illustrating a portable or cellular phone terminal as an example of an electronic apparatus according to a first embodiment of the present invention.

FIG. 1 schematically illustrates a cellular or mobile phone terminal 11 of a so-called flip or clamshell type as an example of an electronic apparatus according to a first embodiment of the present invention. The cellular phone terminal 11 includes a transmitter 12 and a receiver 13. The transmitter 12 has a main enclosure 14 serving as a first enclosure according to the present invention. The receiver 13 has a display enclosure 15 serving as a second enclosure according to the present invention. The main enclosure 14 and the display enclosure 15 may be molded from a reinforced resin material, for example.

A printed circuit board, not shown, is incorporated within the main enclosure 14. Processing circuits, such as a central processing unit (CPU) and a memory, are mounted on the printed circuit board as conventionally known. Input keypads 16, such as an on-hook key, an off-hook key, ten keys, and the like, are embedded in the front flat surface of the transmitter 12. The CPU operates in response to the manipulation of the input keypads 16.

A flat display panel such as a liquid crystal display (LCD) panel 17 is incorporated within the display enclosure 15. A screen opening 18 is defined in the front flat surface of the display enclosure 15. The screen of the LCD panel 17 is placed within the screen opening 18. Various texts and graphics are displayed on the screen of the LCD panel 17 in response to the operation of the CPU.

The microphone hole 19 is defined in the front flat surface of the main enclosure 14. A microphone is embedded in the microphone hole 19. A speaker hole 21 is defined in the front flat surface of the display enclosure 15. A speaker is embedded in the speaker hole 21. The user of the cellular phone terminal 11 talks to the microphone so as to establish a voice call. The speaker reproduces the voice of the other side.

A camera, not shown, is incorporated within the main enclosure 14. The camera includes a camera lens exposed at the rear flat surface of the main enclosure 14. A shutter button 22 is placed at the side of the main enclosure 14. The shutter button 22 is pressed down when taking a photo.

The transmitter 12 is coupled to the receiver 13 through a bi-axial swivel mechanism 23. The swivel mechanism 23 realizes the rotation around a horizontal axis 24 as well as the rotation around a vertical axis 25 between the transmitter 12 and the receiver 13. The horizontal axis 24 is set in parallel with the front flat surface of the main enclosure 14 at the end of the front flat surface of the main enclosure 14. The horizontal axis 24 is likewise set in parallel with the front flat surface of the display enclosure 15 at the end of the front flat surface of the display enclosure 15. A relative rotation of 180 degrees is allowed between the display enclosure 15 and the main enclosure 14 around the horizontal axis 24. On the other hand, the vertical axis 25 is set perpendicular to the front flat surface of the main enclosure 14 at the end of the front flat surface of the main enclosure 14. Here, the vertical axis 25 set perpendicular to the horizontal axis 24. The horizontal axis 25 is allowed to rotate around the vertical axis 25.

Figure 2:
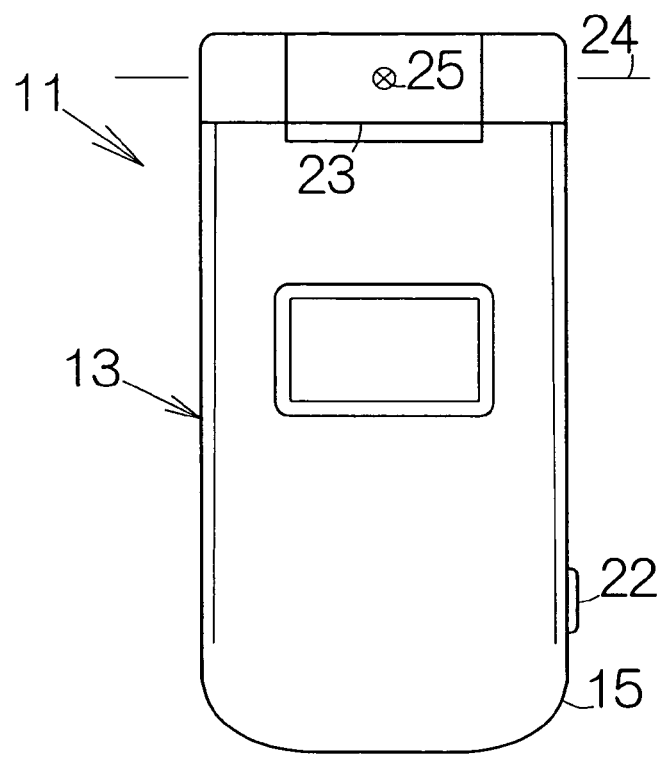
FIG. 2 is a front view schematically illustrating the cellular phone terminal when a phone flip is closed to allow the rear surface of a display enclosure to face forward.

When the horizontal axis 24 takes a first attitude, the transmitter 12 and the receiver 13 face forward, as shown in FIG. 1. Here, the front flat surface of the display enclosure 15 stands perpendicular to the vertical axis 25, for example. When the display enclosure 15 is rotated around the horizontal axis 24 of the first attitude by 180 degrees relative to the main enclosure 14, the front flat surface of the display enclosure 15 is overlaid on the front flat surface of the main enclosure 14, as shown in FIG. 2. The phone flip is in this manner closed in the cellular phone terminal 11.

Figure 3:
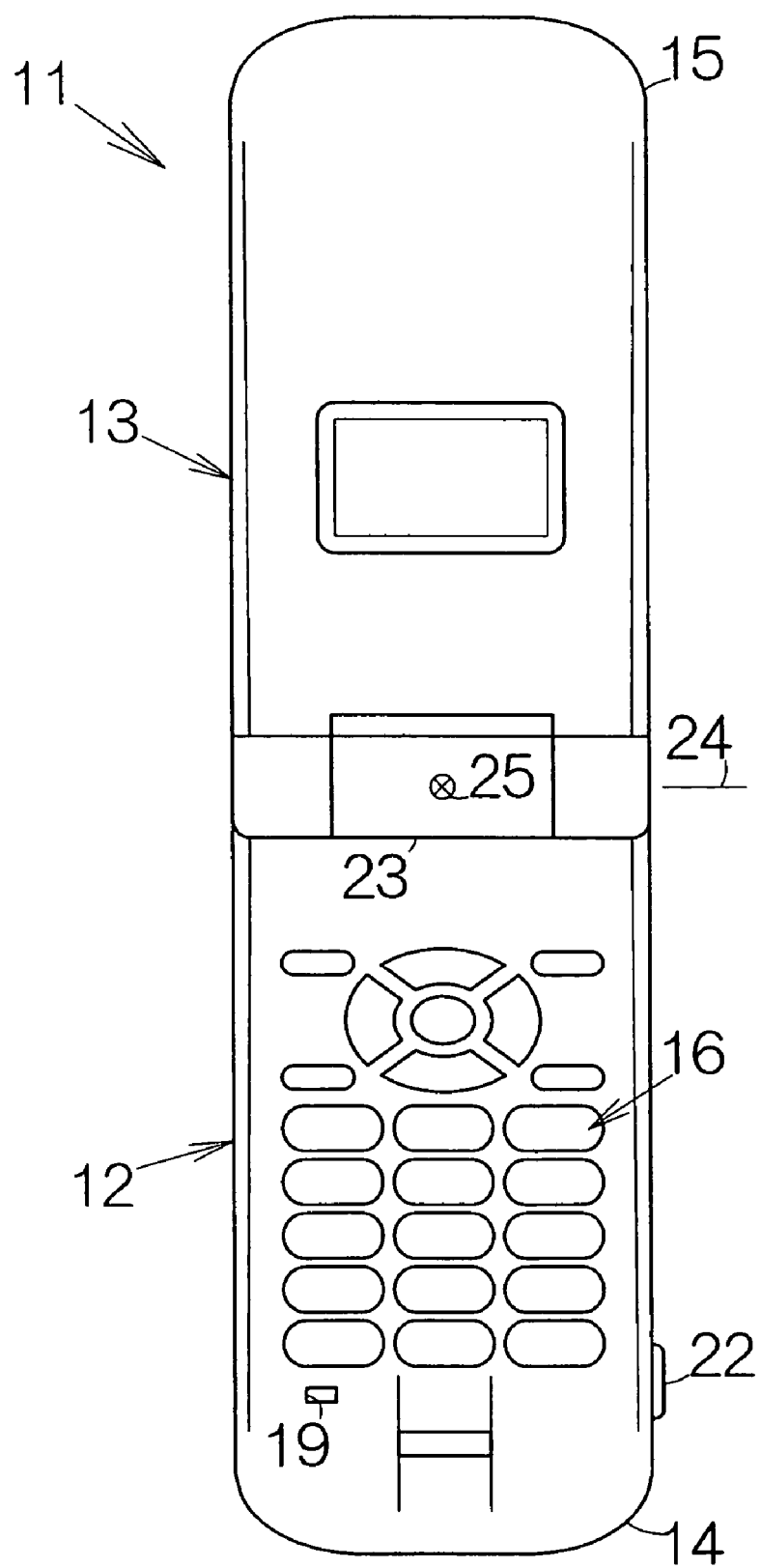
FIG. 3 is a front view schematically illustrating the cellular phone terminal when the phone flip is opened to allow the screen on the front surface of the display enclosure to face forward.

When the horizontal axis 24 is rotated around the vertical axis 25 by 180 degrees in the clockwise direction from the first attitude, the horizontal axis 24 takes a second attitude. The front flat surface of the transmitter 12 faces forward, while the back surface of the receiver 13 faces forward, as shown in FIG. 3, for example, when the receiver 13 rotates around the vertical axis 25 relative to the transmitter 12 as mentioned above. Here, the front flat surface of the display enclosure 15 is set perpendicular to the vertical axis 25, for example. The user is thus allowed to direct the camera lens to himself/herself while the user looks at the LCD panel 17 at the same time.

Figure 4:
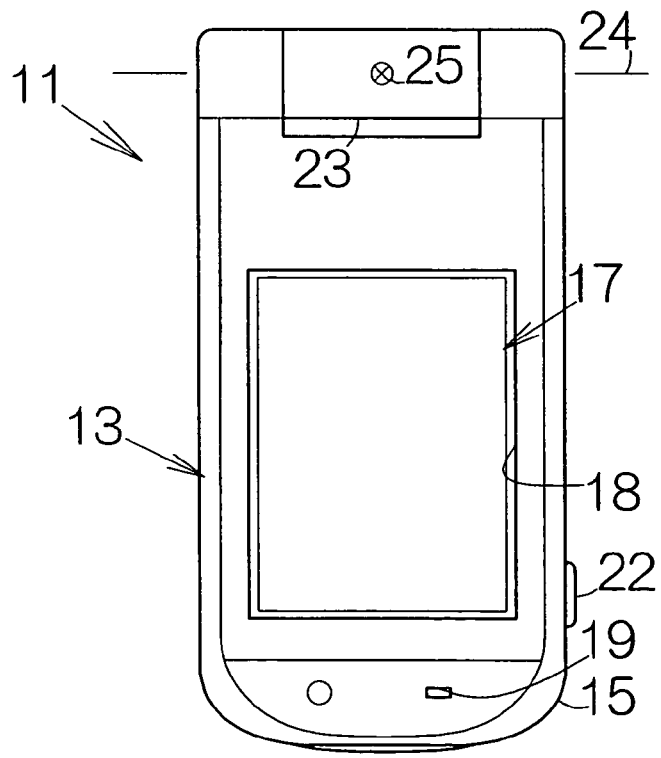
FIG. 4 is a front view schematically illustrating the cellular phone terminal when the phone flip is closed to allow the screen on the front surface of the display enclosure to face forward.

When the display enclosure 15 is rotates around the horizontal axis 24 of the second attitude by 180 degrees relative to the main enclosure 14, the rear flat surface of the display enclosure 15 is overlaid on the front flat surface of the main enclosure 14, as shown in FIG. 4. The phone flip is in this manner closed in the cellular phone terminal 11. In this case, the user of the cellular phone terminal 11 is allowed to direct the camera lens to an object while the user look at the image of the object on the screen of the LCD panel 17 on the optical axis of the camera lens.

Figure 5:
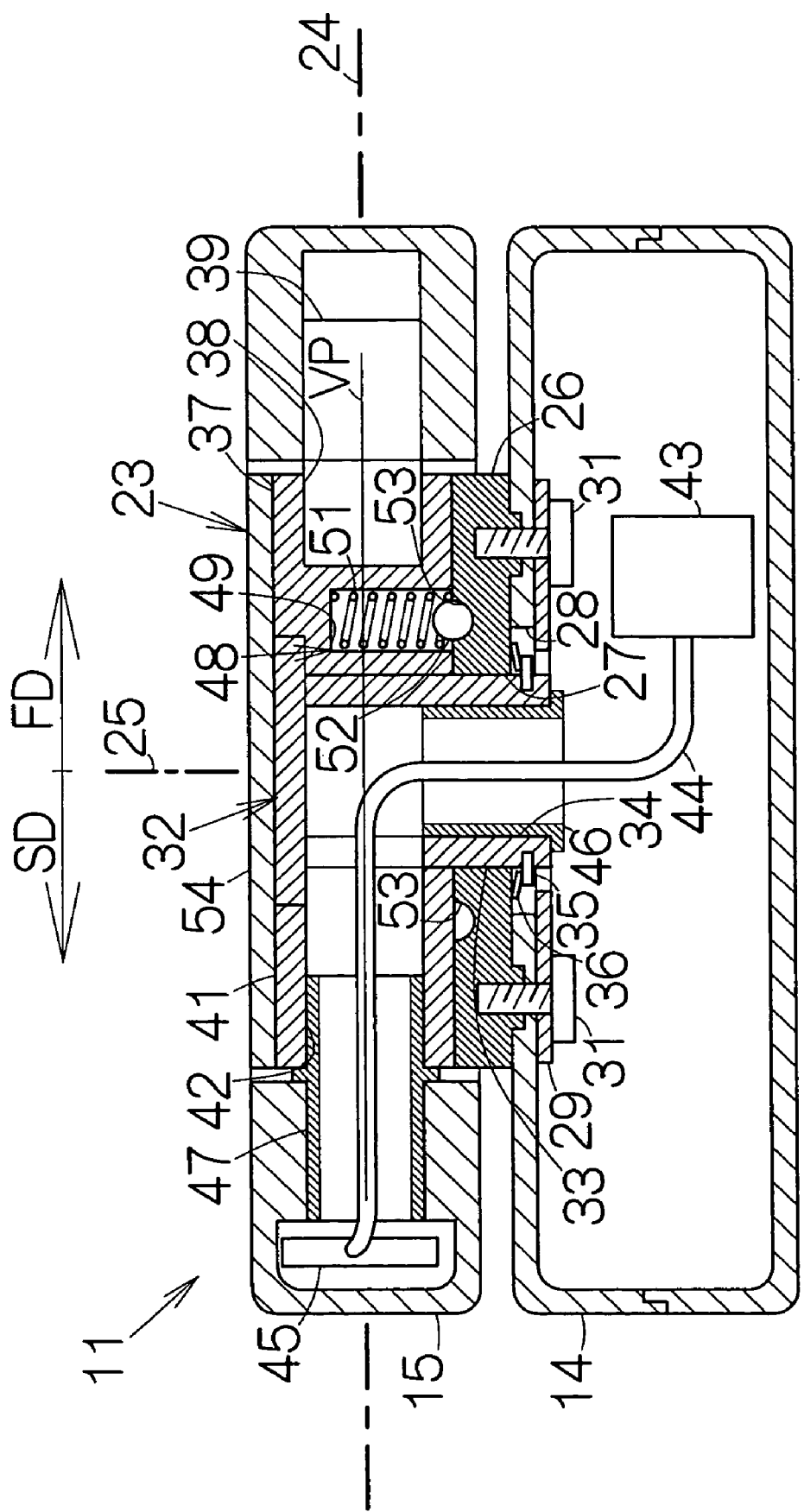
FIG. 5 is an enlarged sectional view taken along the line 5-5 in FIG. 1, for schematically illustrating the structure of a bi-axial swivel mechanism according to a specific example.

The swivel mechanism 23 includes a socket or bearing 26, as shown in FIG. 5. The bearing 26 is fixed to the front flat surface of the main enclosure 14. A cylindrical through hole 27 is defined in the bearing 26. The through hole 27 penetrates through the bearing 26 in the vertical direction perpendicular to the front flat surface of the main enclosure 14. A receiving bore 28 is defined in the main enclosure 14 at a location corresponding to the through hole 27. The through hole 27 and the receiving bore 28 establish connection between the inner space of the main enclosure 14 and the outside of the main enclosure 14.

Figure 6:
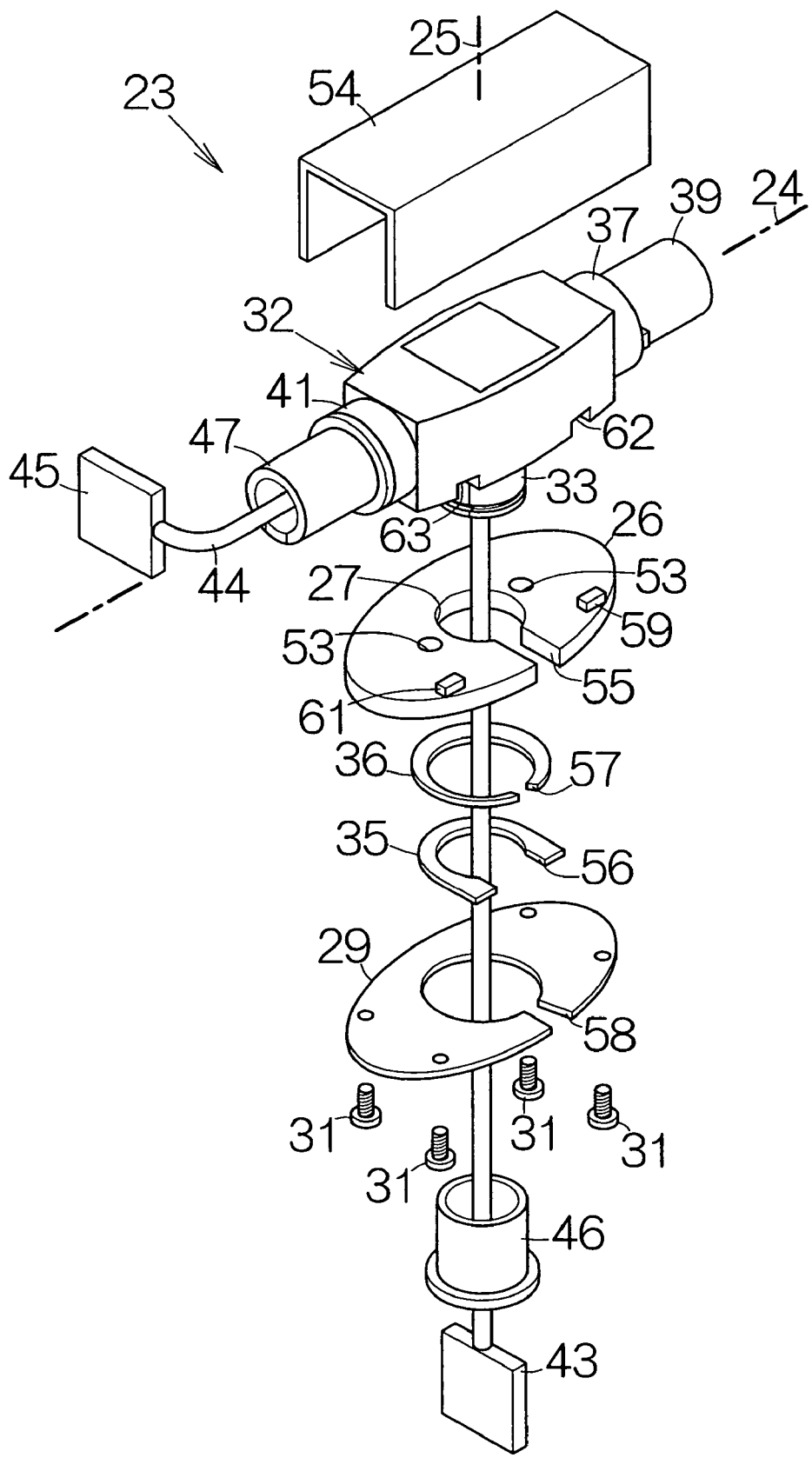
FIG. 6 is an exploded view of the bi-axial swivel mechanism.

Referring also to FIG. 6, a reinforcing plate 29 is over laid on the inside surface of the main enclosure 12. Screws 31 are employed to couple the reinforcing plate 29 and the main enclosure 14 to the bearing 26. The bearing 26 and the reinforcing plate 29 may be made of a metallic material such as a stainless steel.

A support shaft member 32 is received in the bearing 26. The support shaft member 32 includes a support shaft 33 received in the through hole 27 of the bearing 26 for relative rotation. The longitudinal axis of the support shaft 33 is aligned with the vertical axis 25. A cylindrical first hollow space 34 is defined within the support shaft 33. The first hollow space 34 penetrates through the support shaft 33 along the longitudinal axis of the support shaft 33. The first hollow space 34 is connected to the inside space of the main enclosure 14.

A stop ring 35 is fitted around the support shaft 33 at the lower end of the support shaft 33. An annular groove may be formed around the support shaft 33 so as to receive the stop ring 35. A Belleville spring 36 is interposed between the stop ring 35 and the bearing 26. The stop ring 35 and the Belleville spring 36 may be made of a metallic material, for example. The support shaft member 32 is in this manner coupled to the bearing 26 for relative movement.

A first hollow member 37 is defined in the support shaft member 32. The first hollow member 37 extends in a first direction FD from the tip end of the support shaft 33 along an imaginary plane VP intersecting with the vertical axis 25. Here, the imaginary plane VP is set perpendicular to the vertical shaft 25. The first hollow member 37 is designed to define a second hollow space 38 extending in the first direction FD. The second hollow space 38 is shaped into a cylindrical form, for example. The longitudinal axis of the second hollow space 38 is aligned with the horizontal axis 24. The first direction FD is set in parallel with the horizontal axis 24.

The second hollow space 38 is designed to receive the end of a rotation shaft or rotation axis member 39. The rotation axis member 39 is thus fixed to the support shaft member 32. The longitudinal axis of the rotation axis member 39 is aligned with the rotation axis of the display enclosure 15, namely the horizontal axis 24. The other end of the rotation axis member 39 is received on the display enclosure 15. The display enclosure 15 is thus coupled to the main enclosure 14 for relative rotation.

A second hollow member 41 is also defined in the support shaft member 32. The second hollow member 41 extends in a second direction SD, opposite to the first direction FD, from the tip end of the support shaft 33 along the imaginary plane VP. The second hollow member 41 is designed to define a third hollow space 42 extending along the second direction SD. The third hollow space 42 may be shaped into a cylindrical form, for example. The longitudinal axis of the third hollow space 42 is aligned with the horizontal axis 24. The outer end of the third hollow space 42 is connected to the inside space of the display enclosure 15. The inner end of the third hollow space 42 is connected to the first hollow space 34.

A connector 43 is connected to a printed circuit board, not shown, incorporated within the main enclosure 14. Wires 44 are connected to the connector 43. The wires 44 penetrate through the first and third hollow spaces 34, 42. A connector 45 is connected to the front end of the wires 44. The connector 45 is located within the display enclosure 15. The connector 45 is connected to a printed circuit board, not shown, incorporated within the display enclosure 15. Electric connection is thus established between the printed circuit boards in the main enclosure 14 and the display enclosure 15.

The wires 44 pass through first and second collars 46, 47. The first collar 46 is received within the first hollow space 34. The second collar 47 is received within the third hollow space 42. The first and second collars 46, 47 may be made of a resin material, for example. The overall length of the first collar 46 coincides with the overall length of the support shaft 33, for example. The second collar 47 protrudes into the display enclosure 15.

A click mechanism 48 is established for the support shaft member 32. The click mechanism 48 includes an elastic member or coil spring 51 located within a cylindrical hole 49 defined in the support shaft member 32. A ball 52 is attached to the outer end of the coil spring 51. The inner end of the coil spring 51 is received at the bottom of the cylindrical hole 49. The outer end of the cylindrical hole 49 faces the surface of the bearing 26.

The ball 52 is allowed to move within the cylindrical hole 49 based on the elasticity of the coil spring 51. The ball 52 may be made of a metallic material, for example. Dimples 53 are formed on the surface of the bearing 26 so as to receive the ball 52. The dimples 53 may be shaped into a semispherical form, for example. The dimples 53, 53 are located symmetric to each other around the vertical axis 25.

A dressed cover 54 covers over the support shaft member 32. An adhesive may be employed to fix the dressed cover 54 to the support shaft member 32. The dressed cover 54 may be made of a resin material such as a plastic.

As is apparent from FIG. 6, a slit 55 is formed in the bearing 26. The slit 55 extends from the outer periphery to the through hole 27. Slits 56, 57 are also formed in the stop ring 35 and the Belleville spring 36. A slit 58 is also formed in the reinforcing plate 29 so as to extend from the outer periphery to the central hole. The slits 55-58 are designed to receive the wires 44. The slits 55-58 serve to facilitate incorporation of the wires 44 into the bearing 26, the stop ring 35, the Belleville spring 36, and the reinforcing plate 29.

Protrusions 59, 61 are formed on the surface of the bearing 26. When the horizontal axis 24 takes the aforementioned first attitude, the protrusion 59 is received in a groove 62 defined in the support shaft member 32. The groove 62 is allowed to cross the support shaft member 32 in the direction perpendicular to the horizontal axis 24 in parallel with the aforementioned imaginary plane VP. A recess 63 is also formed in the support shaft member 32 so as to receive the protrusion 61. Since protrusion 61 impinges in the recess 63, the recess 63 serves to prevent the support shaft member 32 from rotating in the counterclockwise direction around the vertical axis 25.

The protrusion 59 moves along the groove 62 so that the support shaft member 32 is allowed to rotate around the vertical axis 25 in the clockwise direction. When the support shaft member 32 rotates around the vertical axis 25 by 180 degrees in this manner, the protrusion 59 collides against the side of the support shaft member 32. The protrusion 59 thus serves to prevent the support shaft member 32 from rotating in the clockwise direction. The horizontal axis 24 achieves transition from the first attitude to the second attitude in this manner. The rotation of the display enclosure 15 is restricted within a range of 180 degrees around the vertical axis 25.

The rotation of the support shaft member 32 around the vertical axis 25 induces the action of the click mechanism 48. For example, when the horizontal axis 24 takes the first attitude, the ball 52 is received in one of the dimples 53. The ball 52 is urged against the dimple 53 based on the elasticity of the coil spring 51. The ball 52 serves to hinder the rotation of the support shaft member 32 around the vertical axis 25.

In this case, when a driving force to rotate the support shaft member 32 overcomes the influence of the coil spring 51, the ball 53 is caused to get out of the dimple 53. The ball 52 is received on the surface of the bearing 26 so that the ball 52 is urged back into the cylindrical hole 49. The coil spring 51 gets shrunk. The support shaft member 32 is thus allowed to rotate. The rotation of the support shaft member 32 induces the ball 52 to slide on the surface of the bearing 26.

When the support shaft member 32 has rotated around the vertical axis 25 in the clockwise direction by 180 degrees, for example, the ball 52 is received into the other dimple 53 based on the elasticity of the coil spring 51. The horizontal axis 24 has achieved the transition from the first attitude to the second attitude. The ball 52 is urged into the dimple 53. The support shaft member 32 is prevented from further rotating around the vertical axis 25.

Figure 7:
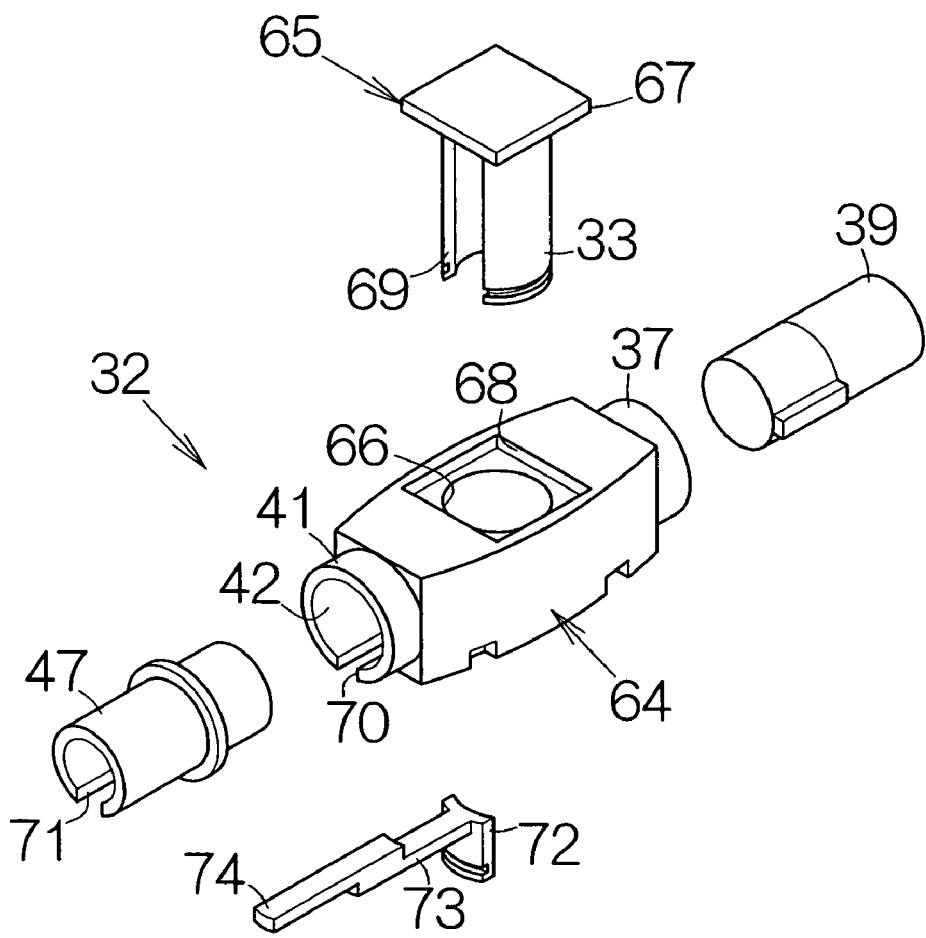
FIG. 7 is an exploded view of a support shaft member.

As shown in FIG. 7, the support shaft member 32 includes a main body 64 and a rotation shaft member 65 carried on the main body 64. The aforementioned first and second hollow members 37, 41 are defined in the main body 64. The aforementioned second and third hollow spaces 38, 42 are thus defined in the main body 64 as described above. The main body 64 may be made of a resin material, for example. A cylindrical through hole 66 is formed in the main body 64. The through hole 66 penetrates through the main body 64 in the direction perpendicular to the top surface of the main body 64. The rotation shaft member 65 is received in the through hole 66. The rotation shaft member 65 defines the aforementioned support shaft 33.

A quadrate flange 67 is formed at the upper end of the rotation shaft member 65. The flange 67 is received in a quadrate recess 68 formed at the top surface of the main body 64. The shape of the recess 68 may correspond to the shape of the flange 67. The rotation shaft member 65 is thus coupled to the main body 64. The rotation shaft member 65 may be made of a metallic material such as a stainless steel, for example. The rotation shaft member 65 may be cut out of a bulk material, for example.

A first elongated depression or groove 69 is formed on the outer periphery of the support shaft 33 in the rotation shaft member 65. The first elongated groove 69 extends over the entire length of the first hollow space 34. A second elongated depression or groove 70 is formed on the outer periphery of the second hollow member 41 in the main body 64. The second elongated groove 70 extends over the entire length of the third hollow space 42. When the rotation shaft member 65 is coupled to the main body 64, the first elongated groove 69 is connected to the second elongated groove 70. An elongated slit 71 is formed in the second collar 47. The elongated slit 71 extends over the entire length of the second collar 47.

A first insert member 72 is fitted in the first elongated groove 69 at the outer periphery of the support shaft 33. The first insert member 72 is designed to close the opening of the first elongated groove 69 over the entire length. The first insert member 72 serves to define the first hollow space 34 between the inner surface of the first elongated groove 69 and the first insert member 72 itself. A second insert member 73 is likewise fitted in the second elongated groove 70 at the outer periphery of the second hollow member 41. The second insert member 73 is likewise designed to close the opening of the second elongated groove 70 over the entire length. The second insert member 73 serves to define the third hollow space 42 between the inner surface of the second elongated groove 70 and the second insert member 73 itself. A third insert member 74 is likewise fitted in the elongated slit 71. The first, second and third insert members 72, 73, 74 may be made of a reinforced resin material, for example. Here, the first, second and third insert members 72, 73, 74 are integrated into a one-piece member. Alternatively, the first, second and third insert members 72, 73, 74 may be separate members.

Next, a brief description will be made on the assembling of the cellular phone terminal 11. The support shaft member 32 is first assembled. The rotation shaft member 65 is inserted into the through hole 66 of the main body 64. The wires 44 are placed within the first and second elongated grooves 69, 70. The connectors 43, 45 may have been coupled to the opposite ends of the wires 44. The first collar 46 may have been attached to the wires 44. The wires 44 are thus allowed to pass through the first and third hollow spaces 34, 42 in a facilitated manner. The workability is thus improved.

The second collar 47 is then received in the third hollow space 42. The wires 44 are inserted into the inner space of the second collar 47 through the elongated slit 71. The first, second and third insert members 72, 73, 74 are then inserted into the first and second elongated grooves 69, 70 and the elongated slit 71, respectively. The first, second and third insert members 72, 73, 74 serve to ensure the strength of the support shaft 33 or the rotation shaft member 65 and the second hollow member 41. The first collar 46 is then received in the first hollow space 34. The rotation axis member 39 is inserted into the second hollow space 38. Press fit may be employed to insert the rotation axis member 39 into the second hollow space 38.

The support shaft member 32 is thereafter fixed to the main enclosure 14. In this case, the support shaft member 32 is first attached to the bearing 26. The coil spring 51 and the ball 52 are placed with in the cylindrical hole 49. The wires 44 are inserted into the Belleville spring 36 based on the slit 57. The Belleville spring 36 is then fitted into the support shaft 36. The stop ring 35 is thereafter attached to the groove of the support shaft 33. The wires 44 are inserted into the stop ring 35 through the slit 56. The support shaft member 32 is in this manner coupled to the main enclosure 14.

The support shaft member 32 and the bearing 26 are fixed on the front flat surface of the main enclosure 14. The connector 43 is inserted in the receiving bore 28 of the main enclosure 14. The connector 43 is coupled to the printed circuit board. The reinforcing plate 29 is positioned at a predetermined location. The screws 31 are screwed into the bearing 26 through the reinforcing plate 29. The bearing 26 is in this manner fixed to the front flat surface of the main enclosure 14. The dressed cover 54 is then attached to the support shaft member 32. The display enclosure 15 is coupled to the rotation axis member 39. The connector 45 is coupled to the printed circuit board.

The cellular phone terminal 11 allows the wires 44 to penetrate through the first hollow space 34 and the third hollow space 42 in the swivel mechanism 23. Since the third hollow space 42 extends in the second direction SD from the tip end of the first hollow space 34, the wires 44 are allowed to run through the rotation shaft member 65 and the main body 64. No additional space is required above the upper end of the rotation shaft member 65. The size of the swivel mechanism 23 can be reduced. The cellular phone terminal 11 is thus allowed to enjoy a reduced size or volume.

Figure 8:
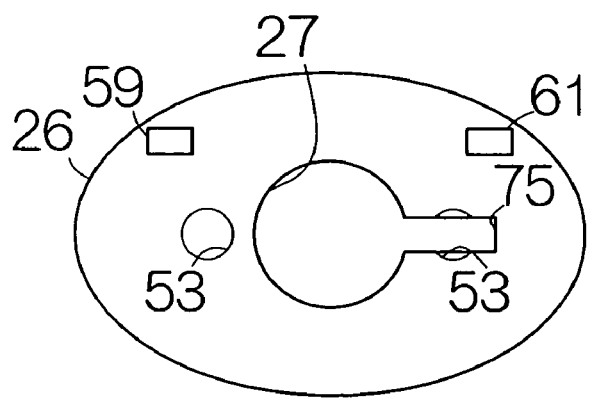
FIG. 8 is a plan view schematically illustrating the structure of a bearing.

The main body 64 and the rotation shaft member 65 may be integrated into a one-piece member in the cellular phone terminal 11. Otherwise, an elongated recess 75 may be formed in the bearing 26 in place of the slit 55, as shown in FIG. 8, for example. The elongated recess 75 may extend across the dimple 53 from the through hole 27. The width and length of the elongated recess 75 may be set in conformity with the size of the connectors 43, 45. The connectors 43, 45 are thus allowed to pass through the elongated recess 75 when the wires 44 are inserted through the through hole 27. The assembling process can be facilitated.

Figure 9:
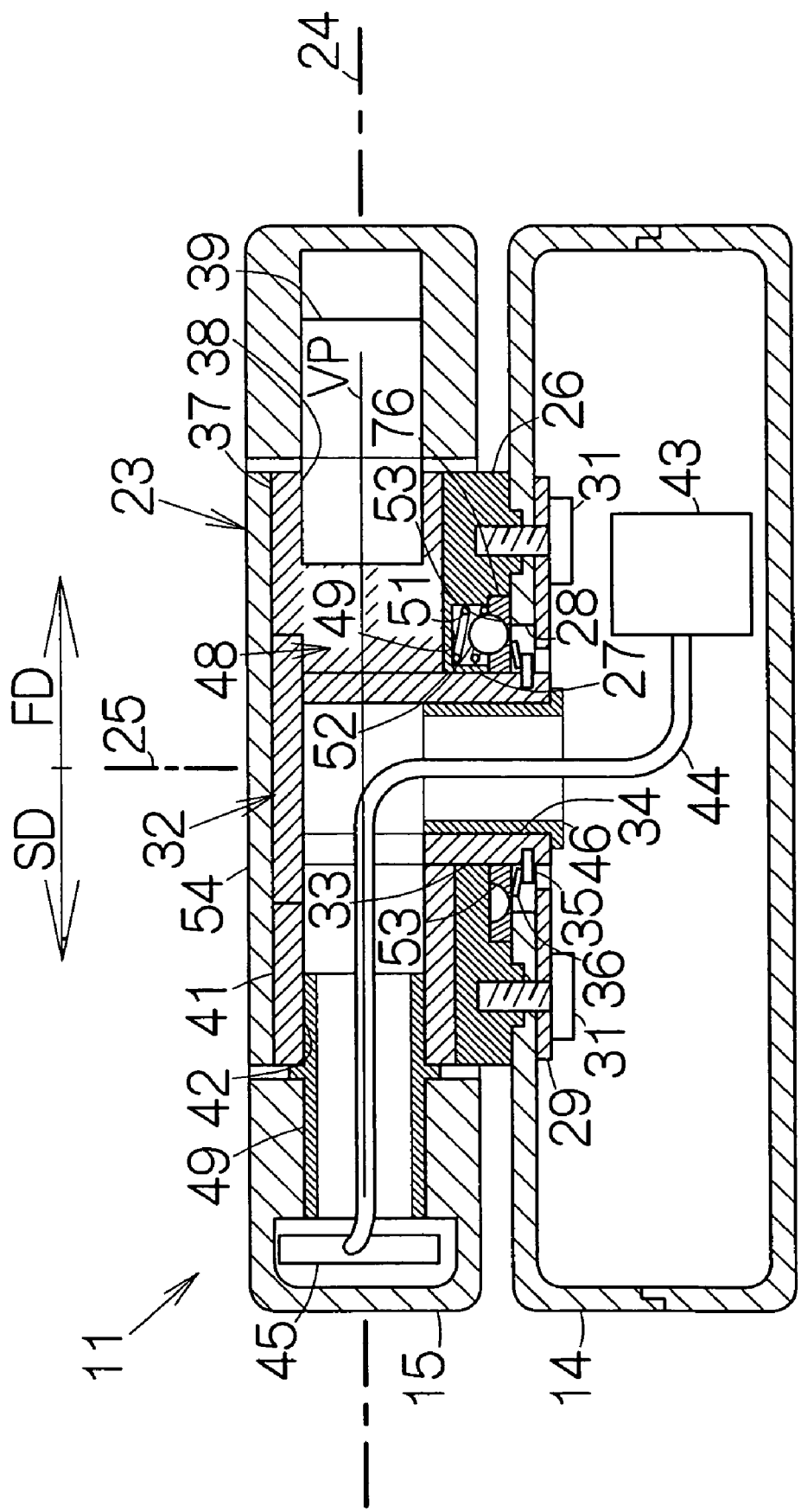
FIG. 9 is a sectional view, corresponding to FIG. 5, schematically illustrating the structure of a bi-axial swivel mechanism according to another specific example.

As shown in FIG. 9, the click mechanism 48 may be incorporated within the bearing 26. Here, a circular cam plate 76 may be interposed between the bearing 26 and the Belleville spring 36, for example. The outer end of the cylindrical hole 49 faces the surface of the cam plate 76. The dimples 53 may be formed on the surface of the cam plate 76. The cam plate 76 is allowed to rotate in response to the rotation of the support shaft member 32 around the vertical axis 25. The ball 52 is allowed to reciprocate between the dimples 53 in response to the rotation.

Figure 10:
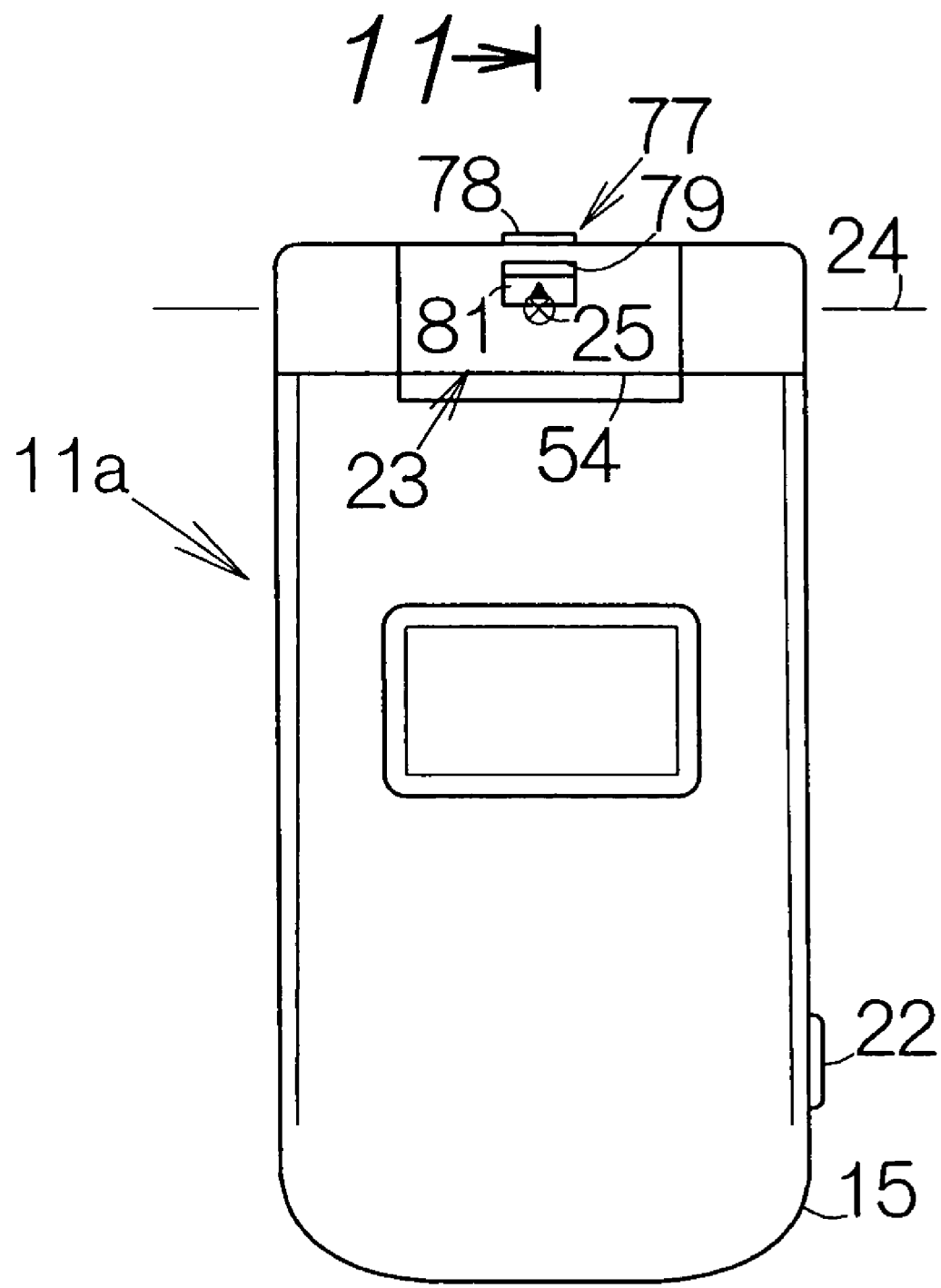
FIG. 10 is a front view schematically illustrating a portable or cellular phone terminal as an example of an electronic apparatus according to a second embodiment of the present invention.

FIG. 10 schematically illustrates a cellular phone terminal 11a according to a second embodiment of the present invention. A restriction member 77 is incorporated within the swivel mechanism 23 in the cellular phone terminal 11a. The restriction member 77 may be made of a reinforced resin material, for example. The restriction member 77 includes a contact piece 78. The contact piece 78 extends in a direction get distanced from the vertical axis 25 along a plane perpendicular to the vertical axis 25. The contact piece 78 is designed to move in the direction perpendicular to the horizontal axis 24 and the vertical axis 25.

An opening 79 is defined in the dressed cover 54 at a position opposed to the top surface of the support shaft member 32. The restriction member 77 includes a lug 81 located within the opening 79. The lug 81 protrudes out of the opening 79 into a space outside the dressed cover 54. When the lug 81 is moved in the opening 79, the contact piece 78 is forced to correspondingly move, as described later. The opening 79 has an extent enough to allow the movement of the lug 81.

Figure 11:
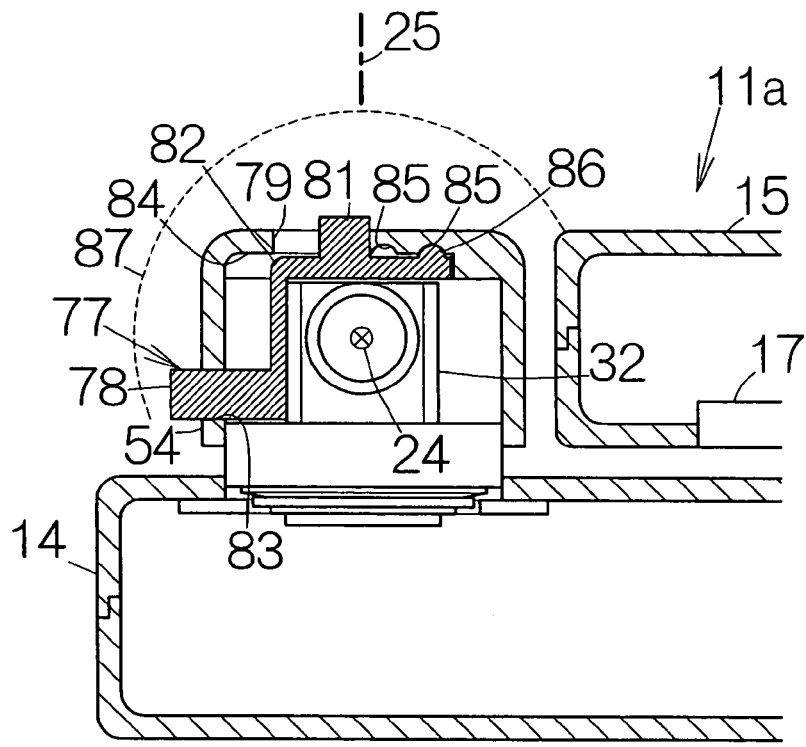
FIG. 11 is a sectional view taken along the line 11-11 in FIG. 10, for schematically illustrating the structure of a bi-axial swivel mechanism according to still another specific example.

As shown in FIG. 11, the restriction member 77 includes a guide piece 82 received on the top surface of the support shaft member 32. The top surface of the support shaft member 32 may extends along a plane perpendicular to the vertical axis 25. The aforementioned lug 81 is formed on the surface of the guide piece 82. The aforementioned contact piece 78 is formed on the tip end of the guide piece 82. The contact piece 78 is located within an opening 83 defined at the side of the dressed cover 54.

An elongated groove 84 is defined on the inner surface of the dressed cover 54. The elongated groove 84 is designed to extend in a direction perpendicular to the horizontal axis 24 and the vertical axis 25. The guide piece 82 on the restriction member 77 is located inside the elongated groove 84. The elongated groove 84 serves to guide the movement of the guide piece 82. Front and rear depressions 85, 85 are defined within the elongated groove 84 along the direction of movement of the restriction member 77. The depressions 85, 85 may define a space of a semicolumnar shape extending in the direction perpendicular to the direction of the movement of the restriction member 77.

The depressions 85, 85 are designed to receive a protrusion 86 formed on the surface of the guide piece 82. The movement of the guide piece 82 induces reciprocation of the protrusion 86 between the depressions 85, 85. The protrusion 86 may be shaped into a semicolumnar shape extending in the direction perpendicular to the direction of the movement of the restriction member 77.

Figure 12:
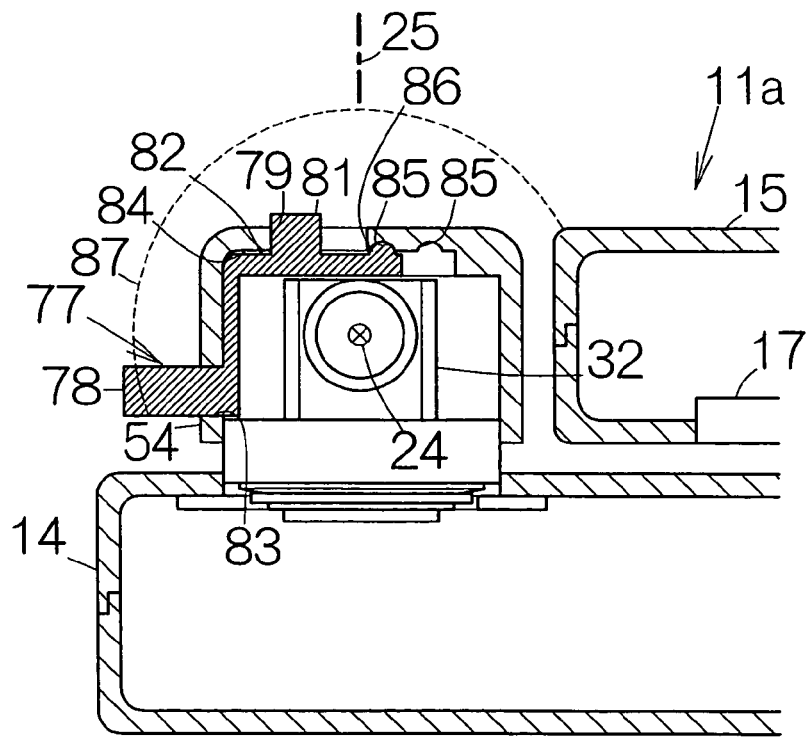
FIG. 12 is a sectional view, corresponding to FIG. 11, schematically illustrating a restriction member at a front position.

When the contact piece 78 is positioned at a second position or retreat position, the contact piece 78 gets closer to the vertical axis 25. The contact piece 78 is allowed to retreat from a movement path 87 of the display enclosure 15. The movement path 87 is defined based on the rotation of the display enclosure 15 around the horizontal axis 24. When the contact piece 78 is positioned at a first position or front position based on the movement of the lug 81, the contact piece 78 gets distanced from the vertical axis 25, as shown in FIG. 12, for example. The contact piece 78 is thus allowed to get into the movement path 87 of the display enclosure 15. Like reference numerals are attached to structure and components equivalent to those of the aforementioned first embodiment.

As described above, when the contact piece 78 is positioned at the retreat position, the contact piece 78 retreats from the movement path 87 of the display enclosure 15. The display enclosure 15 is thus allowed to rotate around the horizontal axis 24 of the first attitude over a range of 180 degrees relative to the main enclosure 14. Here, the range of the relative rotation may be set larger than 180 degrees.

Figure 13:
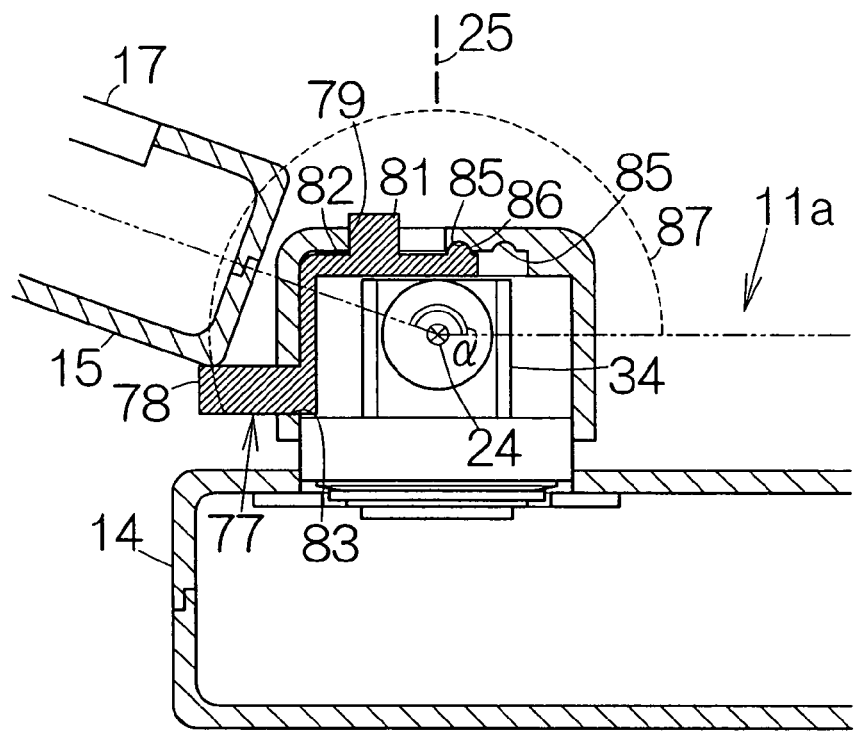
FIG. 13 is a sectional view, corresponding to FIG. 11, schematically illustrating the restriction member receiving the display enclosure.

On the other hand, when the contact piece 78 is positioned at the front position, the contact piece 78 gets into the movement path 87 of the display enclosure 15, as shown in FIG. 13. The relative rotation of the display enclosure 15 around the horizontal axis 24 of the first attitude is restrained over a range smaller than 180 degrees. Here, the range may be set at an extent of 160 degrees.

Figure 14:
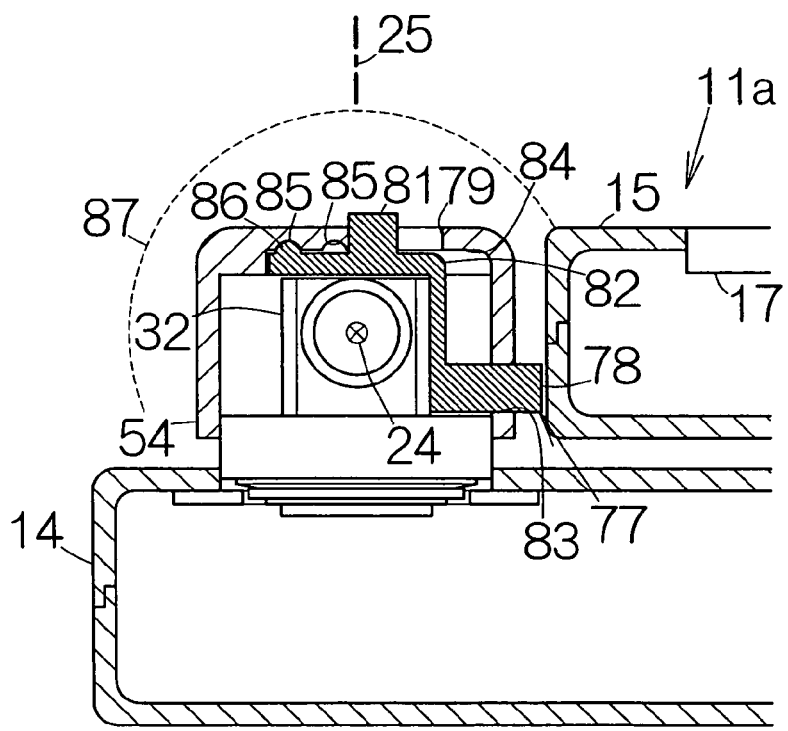
FIG. 14 is a sectional view, corresponding to FIG. 11, schematically illustrating the restriction member when the horizontal axis takes a second attitude.

When the horizontal axis 24 rotates around the vertical axis 25 by 180 degrees in the clockwise direction, the horizontal axis 24 takes the second attitude, as shown in FIG. 14. In this case, the contact piece 78 may be positioned at the retreat position. The contact piece 78 retreats from the movement path 87 of the display enclosure 15. The display enclosure 15 can be overlaid on the front flat surface of the main enclosure 14 around the horizontal axis 25 of the second attitude, as shown in FIG. 4. The user of the cellular phone terminal 11 is allowed to look at the screen of the LCD panel 17 on the optical axis of the camera lens directed to an object.

The cellular phone terminal 11a enables restriction of the relative rotation of the display enclosure 15 around the horizontal axis 24 within a range smaller than 180 degrees, such as 160 degrees, when the restriction member 77 is positioned at the front position. The relative rotation of 160 degrees serves to establish a superior positional relationship between the speaker on the display enclosure 15 and the microphone on the main enclosure 14 in conformity with the positional relationship between the ear and mouth of the user. The user is allowed to enjoy a superior acoustic performance of the cellular phone terminal 11a.

Moreover, a range of the relative rotation may be set at any extent within a range smaller than 180 degrees based on the size of the restriction member 77 at the front position. In addition, the retreat position may be set anywhere to establish a desirable range of the relative rotation, so that the range of the relative rotation can be set larger than 180 degrees.

Figure 15:
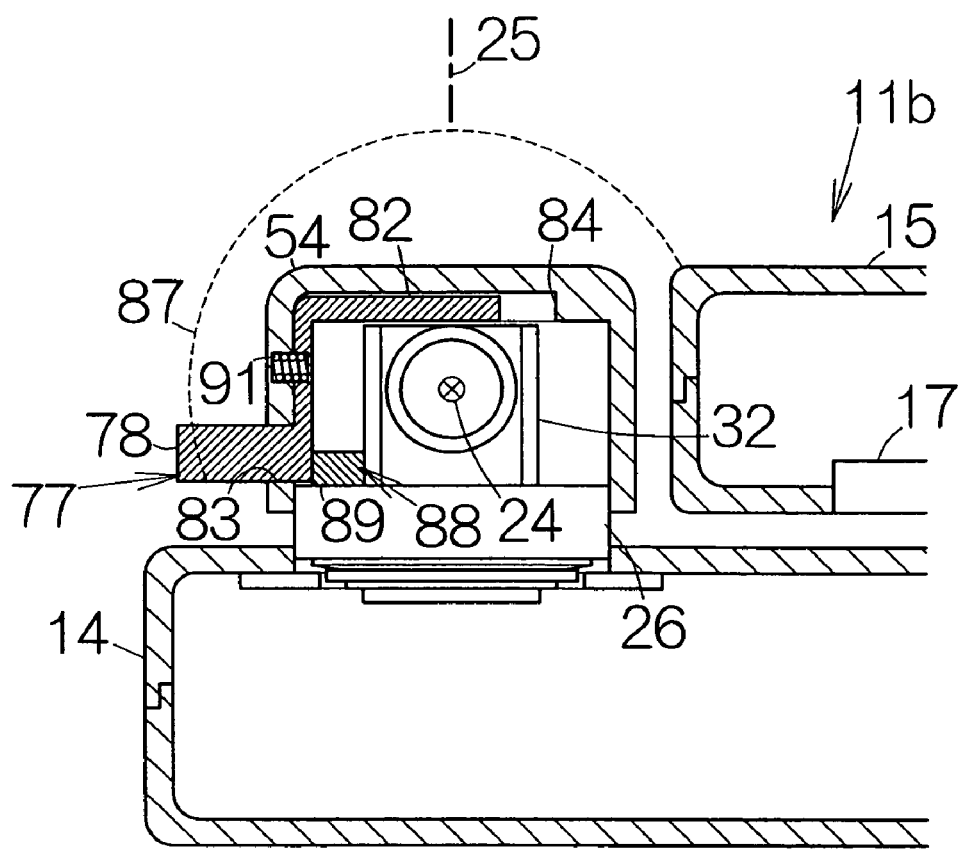
FIG. 15 is a sectional view, corresponding to FIG. 11, for schematically illustrating a bi-axial swivel mechanism in a cellular phone terminal as an example of an electronic apparatus according to a third embodiment of the present invention.

FIG. 15 schematically illustrates the structure of a cellular phone terminal 11b according to a third embodiment of the present invention. The cellular phone terminal 11b includes a cam mechanism 88 causing the movement of the restriction member 77. The cam mechanism 88 has a protrusion 89 standing from the bearing 26, and an elastic member such as a coil spring 91 interposed between the guide piece 82 and the dressed cover 54. The protrusion 89 protrudes in the centrifugal direction around the vertical axis 25. The restriction member 77 is designed to receive a driving force urging the restriction member 77 from the front position to the retreat position based on the elasticity of the coil spring 91.

Figure 16:
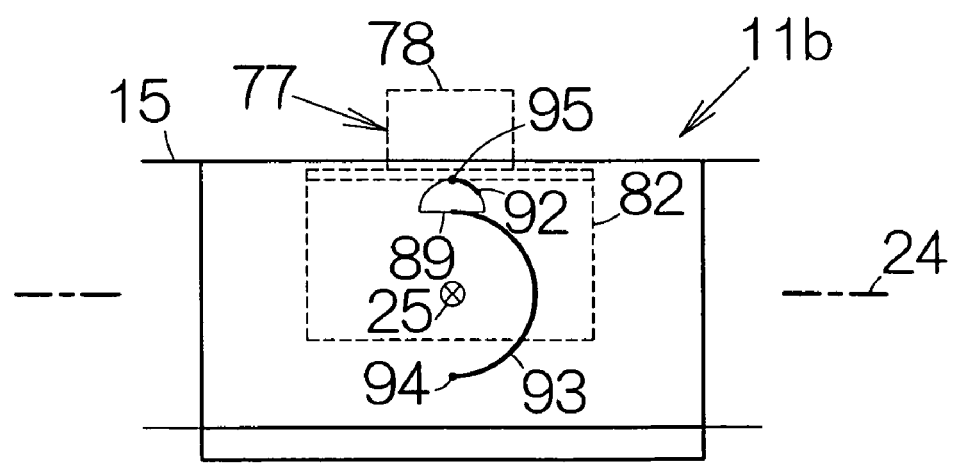
FIG. 16 is an enlarged partial view of the cellular phone terminal for schematically illustrating the structure of a cam mechanism.

As shown in FIG. 16, a cam surface 92 is formed on the protrusion 89. The cam surface 92 may be defined based on the generatrices parallel to the vertical axis 25. A datum imaginary cylindrical surface 93 is defined around the vertical axis 25. The datum imaginary cylindrical surface 93 is set according to the restriction member 77 at the retreat position. Specifically, the radius of the datum imaginary cylindrical surface 93 corresponds to the distance between the vertical axis 25 and the restriction member 77 at the retreat position.

When the horizontal axis 24 takes the second attitude, the restriction member 77 is positioned along the datum imaginary cylindrical surface 93 at a first generatrix 94. When the horizontal axis 24 takes the first attitude, the restriction member 77 is positioned along the cam surface 92 at a second generatrix 95. The first and second generatrices 94, 95 and the vertical axis 25 are aligned within a plane. The cam surface 92 gets remoter from the datum imaginary cylindrical surface 93 as it gets closer to the second generatrix 95.

The lug 81, the depressions 85 and the protrusion 86 can be omitted from the cellular phone terminal 11b. Likewise, the opening 79 may be omitted from the dressed cover 54. The exteriors of the dressed cover 54 can be improved. Like reference numerals are attached to structure or components equivalent to those of the aforementioned first and second embodiments.

Figure 17:
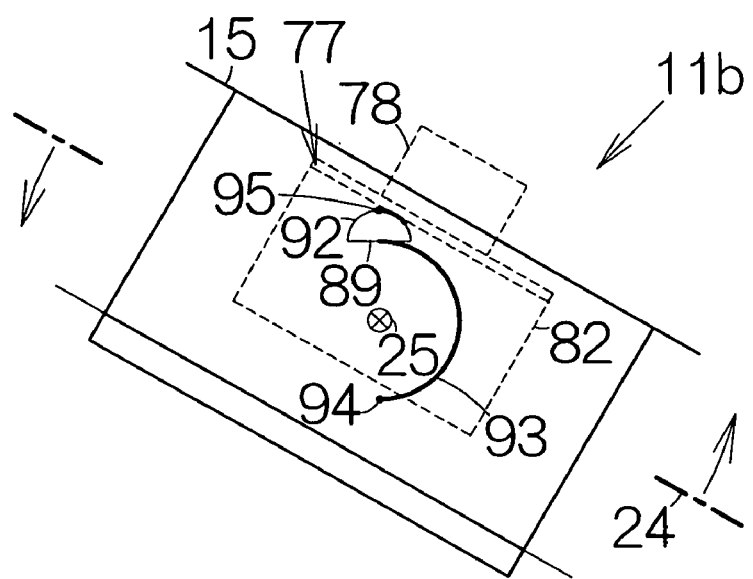
FIG. 17 is an enlarged partial view of the cellular phone terminal for schematically illustrating the structure of the cam mechanism.
Figure 18:
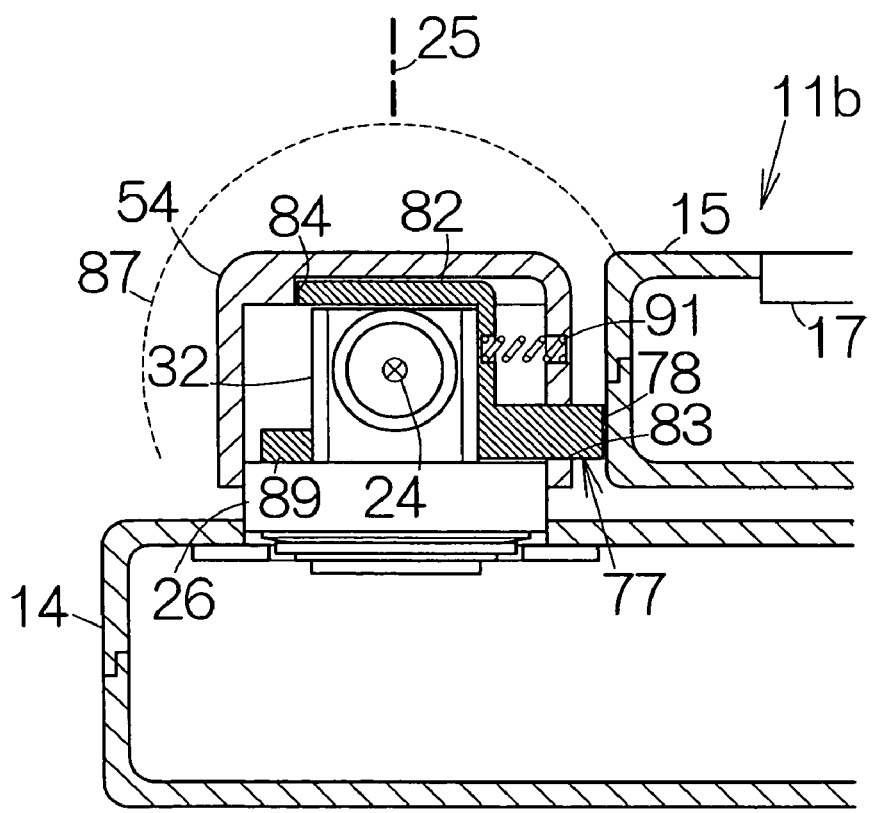
FIG. 18 is a sectional view, corresponding to FIG. 15, for schematically illustrating the movement of the restriction member.

As shown in FIG. 17, when the horizontal axis 24 rotates around the vertical axis from the second attitude to the first attitude, the cam surface 92 serves to urge the restriction member 77 away from the vertical axis 25 against the elasticity of the coil spring 91. The contact piece 78 can thus be positioned at the front position. The contact piece 78 accordingly gets into the movement path 87 of the display enclosure 15, as shown in FIG. 15. Accordingly, the relative rotation of the display enclosure 15 around the horizontal axis 24 of the first attitude can be restrained to an extent smaller than 180 degrees. Here, the range of the relative rotation may be set at 160 degrees, for example. As long as the horizontal axis 24 takes the first attitude, the restriction member 77 stays at the front position.

On the other hand, when the horizontal axis rotates around the vertical axis 25 from the first attitude to the second attitude, the elasticity of the coil spring 91 serves to urge the restriction member 77 from the front position to the retreat position. The contact piece 78 reaches the retreat position. The contact piece 78 retreats from the movement path 87 of the display enclosure 15. This enables the rotation of the display enclosure 15 around the horizontal axis 24 of the first attitude over a range of 180 degrees. Here, the range of the relative rotation may be set at an extent equal to or larger than 180 degrees.

The cellular phone terminal 11b enables an automatic movement of the restriction member 77 based on the action of the cam mechanism 88. The user of the cellular phone terminal 11b needs not get concerned about the position of the restriction member 77 when the user operates the cellular phone terminal 11b. If the relative rotation is set at an extent of 160 degrees, the user is allowed to enjoy a superior acoustic performance of the cellular phone terminal 11b in the manner as described above.

The bi-axial swivel mechanism 23 may be utilized in an electronic apparatus having a pair of rotation axis, such as a portable vie cassette recorder (VCR), a portable digital assistant (PDA), a notebook personal computer, or the like, in addition to the aforementioned cellular phone terminals 11, 11a, 11b, for example.

What is claimed is:

1. A bi-axial swivel mechanism comprising:
   a socket fixed to an enclosure;
   a support shaft received in the socket for relative rotation;
   a first hollow space penetrating through the support shaft along a longitudinal axis of the support shaft;
   a first hollow member extending in a first direction from a tip end of the support shaft along an imaginary plane intersecting with the longitudinal axis of the support shaft, said first hollow member defining a second hollow space extending in the first direction; and
   a second hollow member extending in a second direction opposite to the first direction from the tip end of the support shaft along the imaginary plane, said second hollow member defining a third hollow space extending in the second direction from a tip end of the first hollow space.

2. The bi-axial swivel mechanism according to claim 1, further comprising:
   a first elongated depression formed on an outer periphery of the support shaft all over a length of the first hollow space;

a first insert member received in the first elongated depression at the outer periphery of the support shaft, said first insert member defining the first hollow space in the first elongated depression;

a second elongated depression formed on an outer periphery of the second hollow member all over a length of the third hollow space; and a second insert member received in the second elongated depression at the outer periphery of the second hollow member, said second insert member defining the third hollow space in the second elongated depression.

3. An electronic apparatus comprising:

first and second enclosures;

a socket fixed to the first enclosure;

a support shaft received in the socket for relative rotation;

a first hollow space penetrating through the support shaft along a longitudinal axis of the support shaft;

a first hollow member extending in a first direction from a tip end of the support shaft along an imaginary plane intersecting with the longitudinal axis of the support shaft, said first hollow member defining a second hollow space extending in the first direction;

a rotation shaft received in the second hollow space so as to couple the second enclosure to the first enclosure for relative rotation;

a second hollow member extending in a second direction opposite to the first direction from the tip end of the support shaft along the imaginary plane, said second hollow member defining a third hollow space extending in the second direction from a tip end of the first hollow space; and a wire penetrating through the first and third hollow spaces.

4. The electronic apparatus according to claim 3, further comprising:

a first elongated depression formed on an outer periphery of the support shaft all over a length of the first hollow space;

a first insert member received in the first elongated depression at the outer periphery of the support shaft, said first insert member defining the first hollow space in the first elongated depression;

a second elongated depression formed on an outer periphery of the second hollow member all over a length of the third hollow space; and a second insert member received in the second elongated depression at the outer periphery of the second hollow member, said second insert member defining the third hollow space in the second elongated depression.

5. A bi-axial swivel mechanism comprising:

a socket;

a support shaft received in the socket for rotation around a vertical axis;

a rotation shaft having a longitudinal axis on a horizontal axis defined within a plane perpendicular to the vertical axis; and a restriction member supported on the support shaft for movement between first and second positions, said restriction member at the first position designed to restrict a relative rotation around the horizontal axis between the support shaft and the rotation shaft over a range smaller than 180 degrees, said restriction member at the second position designed to allow the relative rotation around the horizontal axis between the support shaft and the rotation shaft over a range equal to or larger than 180 degrees.

6. The bi-axial swivel mechanism according to claim 5, wherein said restriction member moves to the second position from the first position in response to rotation of the horizontal axis around the vertical axis by 180 degrees.

7. An electronic apparatus comprising:

a first enclosure;

a support shaft supported on the first enclosure for rotation around a vertical axis;

a second enclosure designed to rotate relative to the support shaft around a horizontal axis defined within a plane set perpendicular to the vertical axis; and a restriction member supported on the support shaft for movement between first and second positions, said restriction member at the first position designed to restrict a relative rotation around the horizontal axis between the first enclosure and the second enclosure over a range smaller than 180 degrees, said restriction member at the second position designed to allow the relative rotation around the horizontal axis between the first enclosure and the second enclosure over a range equal to or larger than 180 degrees.

8. The electronic apparatus according to claim 7, wherein said restriction member moves to the second position from the first position in response to rotation of the horizontal axis around the vertical axis by 180 degrees.

9. A bi-axial swivel mechanism comprising:

a socket;

a support shaft received in the socket for relative rotation around a vertical axis;

a rotation shaft having a longitudinal axis on a horizontal axis defined within a plane perpendicular to the vertical axis; and a restriction member supported on the support shaft for movement between first and second positions, said restriction member at the first position designed to restrict a relative rotation around the horizontal axis of a first attitude between the support shaft and the rotation shaft over a range smaller than 180 degrees, said restriction member at the second position designed to allow the relative rotation around the horizontal axis of a second attitude between the support shaft and the rotation shaft over a range equal to or larger than 180 degrees, said second attitude being set at a 180 degrees turn from the first attitude around the vertical axis.

10. The bi-axial swivel mechanism according to claim 9, further comprising a cam mechanism located on the socket, said cam mechanism causing the movement of the restriction member in response to the rotation of the support shaft.

11. An electronic apparatus comprising:

a first enclosure;

a support shaft supported on the first enclosure for rotation around a vertical axis;

a second enclosure designed to rotate relative to the support shaft around a horizontal axis defined within a plane set perpendicular to the vertical axis; and a restriction member supported on the support shaft for movement between first and second positions, said restriction member at the first position designed to restrict a relative rotation around the horizontal axis of a first attitude between the first enclosure and the second enclosure over a range smaller than 180 degrees, said restriction member at the second position designed to allow the relative rotation around the horizontal axis of a second attitude between the first enclosure and the second enclosure over a range equal to or larger than 180 degrees, said second attitude being set at a 180 degrees turn from the first attitude around the vertical axis.

12. The electronic apparatus according to claim 11, further comprising a cam mechanism located on the first enclosure, said cam mechanism causing the movement of the restriction member in response to the rotation of the support shaft.

* * * * *